F. B. RAE.
ELECTRIC MOTOR AND CONTROLLING SYSTEM.
APPLICATION FILED JUNE 25, 1907.
979,094.
Patented Dec. 20, 1910.
4 SHEETS—SHEET 1.
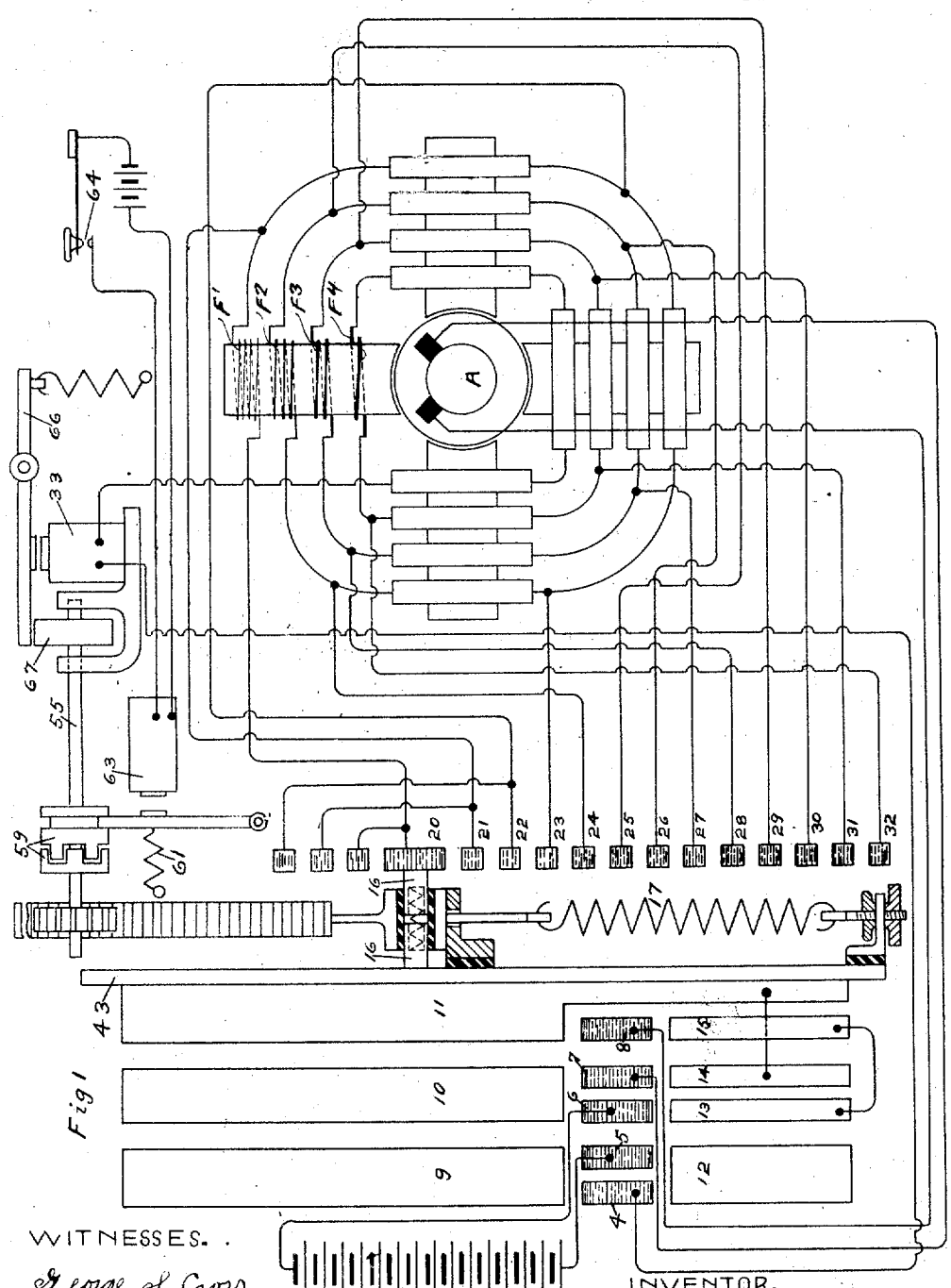
WITNESSES.
George S. Cross.
V. J. Gillett
INVENTOR.
FRANK B. RAE.
by Edwards, Sager & Wooster
ATTORNEYS.

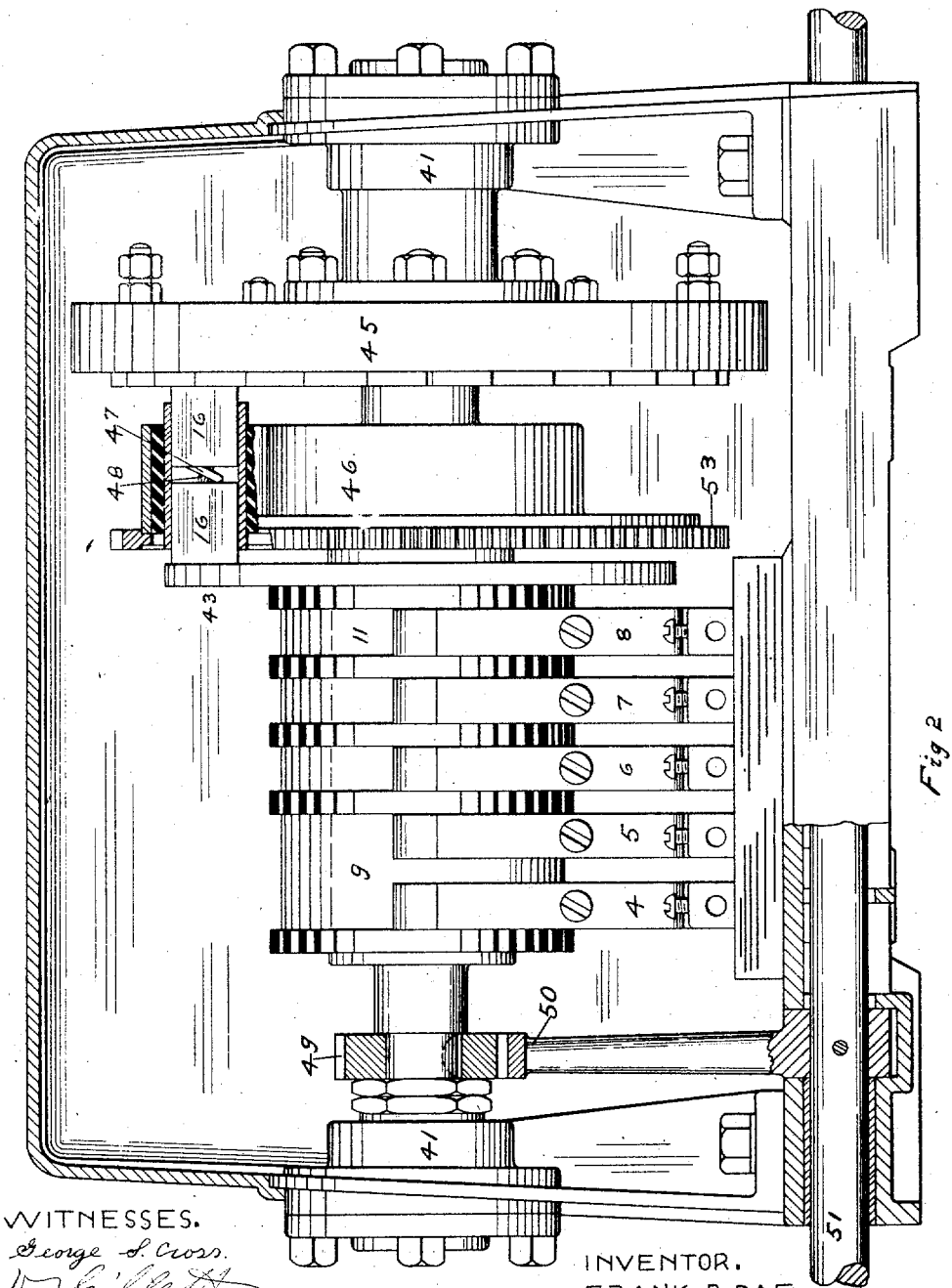

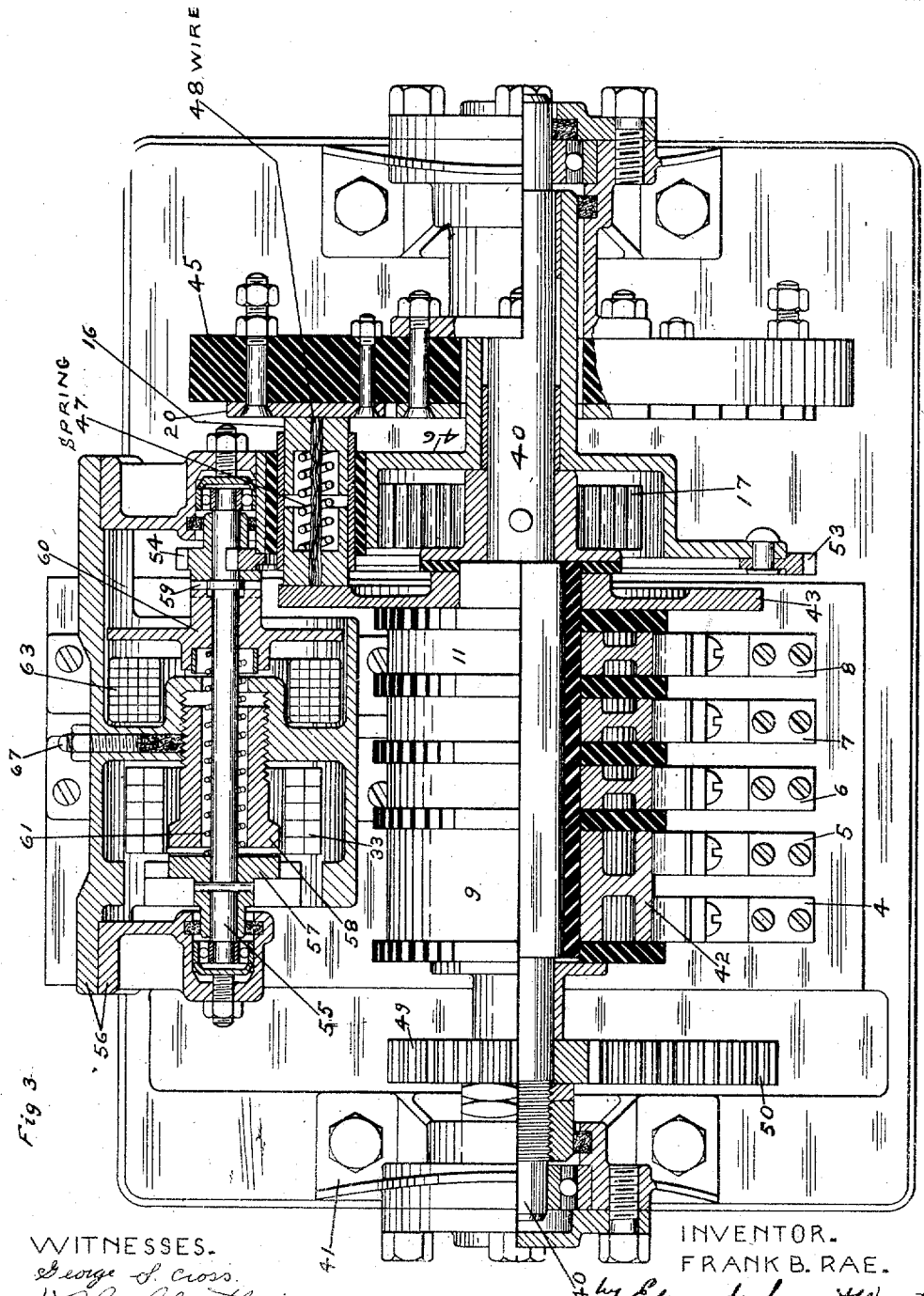

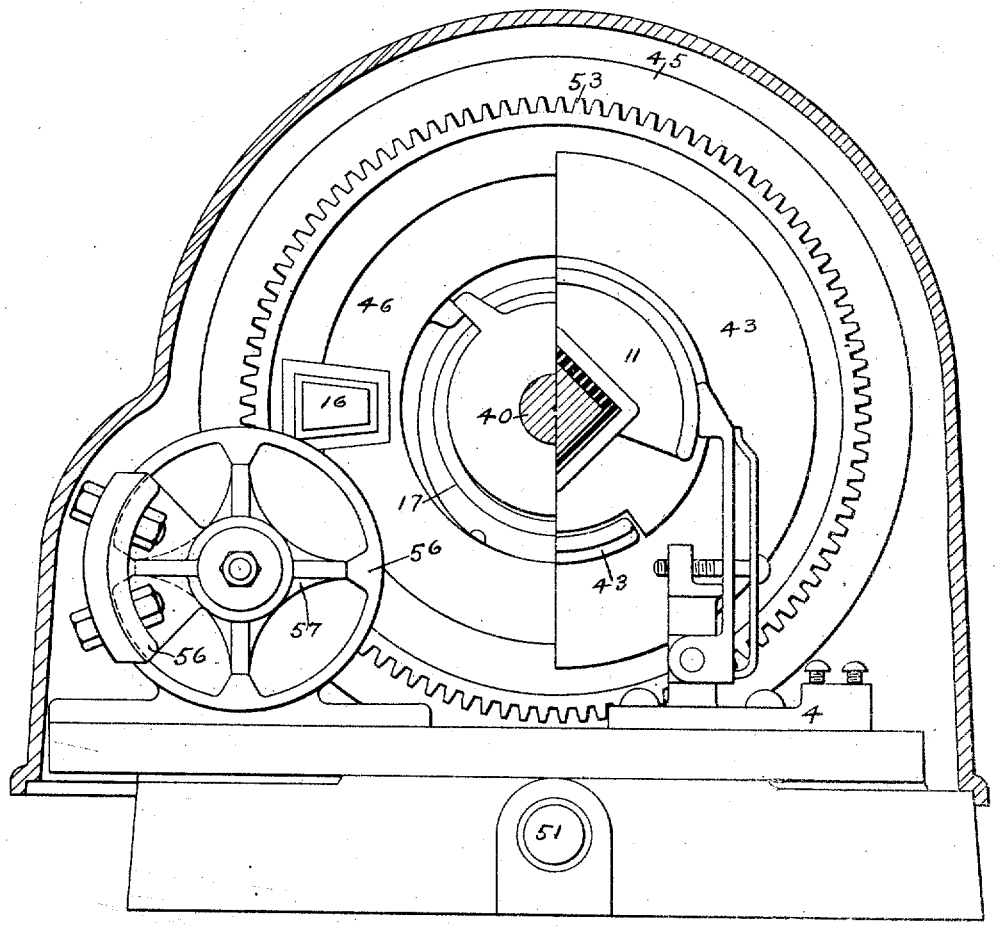

UNITED STATES PATENT OFFICE.

FRANK B. RAE, OF DETROIT, MICHIGAN, ASSIGNOR, BY MESNE ASSIGNMENTS, TO RAE ELECTRIC COMPANY, A CORPORATION OF MICHIGAN.

ELECTRIC MOTOR AND CONTROLLING SYSTEM.

979,094.   Specification of Letters Patent.   Patented Dec. 20, 1910.

Application filed June 25, 1907. Serial No. 380,733.

*To all whom it may concern:*

Be it known that I, FRANK B. RAE, a citizen of the United States, residing at Detroit, in the county of Wayne and State of Michigan, have invented certain new and useful Improvements in Electric Motors and Controlling Systems, of which the following is a full, clear, and exact specification.

This invention relates to electric motors and controlling means, and has particular reference to electric motors of the variable speed type such as are used for the operation of elevators, machine tools, vehicles, etc. More especially, the invention has reference to motors which are to be operated under conditions of varying load and speed, wherein it is desired to economize, as far as possible the starting current, and to prevent, by automatic means acting irrespective of the operator or the position of the controller an abnormal flow of current.

In motors propelled by current from a storage battery, such as are used in automobiles and railway cars, the use of armature resistances involves a large waste of current, which reduces the mileage which can be obtained from a single charge of the battery, and an object of this invention is to provide a variable speed motor in which the speed changes are obtained by varying the field magnetization and the ohmic resistance of the field at the same time. Preferably, I have provided a motor having the field coils divided into a number of groups each having a different ohmic resistance, together with a controlling switch which successively cuts out one group of coils after another. Thus, at the starting position all of the groups are connected in series, to produce the maximum field magnetization and giving a circuit of the largest ohmic resistance, and at successive positions the groups of coils of progressively diminishing resistance are cut out, until at the full speed running position, both the field magnetization and the ohmic resistance of the circuit are at the lowest value.

A further object of the invention is to provide in combination with a variable speed motor having a manually actuated controller, means whereby the amount of current permitted to flow in starting the motor will be determined according to the counter electromotive force developed by the motor and independently of the position of the controller handle. Under ordinary conditions, it is possible for the operator to move the switch rapidly to its extreme position, thereby admitting full current to the motor before it has time to accelerate and produce sufficient counter E. M. F. to hold back the current. To prevent this abnormal flow of current irrespective of the action of the operator or the position of the controller, I have provided a yielding actuating connection between the controller handle and the moving contacts which regulate the motor connections in combination with a braking or retarding magnet connected in the armature circuit and of such proportions that, when a predetermined amount of current is exceeded, acts to lock the moving contacts until the current flow is cut down by increase of counter E. M. F. sufficiently to release the moving contacts. In case the controller handle has been moved beyond a position corresponding to a certain counter E. M. F. the magnet will, as above stated, lock the contacts at the position corresponding to that speed of the motor which, with a certain magnetization produces the predetermined current which energizes the magnet, but when the magnet is released by the diminution of current the yielding actuating connection automatically moves the contacts to a position corresponding to the position of the controller handle, or to a position where the magnet is again energized to lock the contacts. By this means, the current is automatically kept below the predetermined amount, which will of course, be calculated for individual conditions. In operating an automobile for instance, it is at times desirable to operate the motor under abnormally heavy current, and to this end, means is provided whereby the automatic braking means can be thrown out of operation when desired.

The invention will be more fully explained herein in connection with a diagrammatic view showing the general operation of the invention, and then in connection with a specific form of controlling switch embodying the preferred form of mechanical construction for obtaining the general results stated.

In the accompanying drawings, Figure 1 is a diagrammatic view of a motor embodying the invention; Fig. 2 is a front elevation of the controlling switch; Fig. 3 a plan view, partly in section; and Fig. 4 an end elevation partly in section.

Referring to Fig. 1, there is shown a four-pole motor, each pole being wound with four separate windings, in which the sizes of wire and number of turns are varied to produce the desired excitation under varying conditions and positions of the controller switch. Each pole is provided with four windings $F^1$, $F^2$, $F^3$ and $F^4$, respectively, corresponding windings on each pole constituting groups. The coils $F^1$ are of relatively fine wire and many turns, the coils $F^2$ are of coarser wire and of less number of turns, the coils $F^3$ are of still coarser wire and fewer turns, and the coils $F^4$ are proportioned for the maximum speed of the motor under full load conditions. These coils are connected in series with the armature A, and are successively cut out by the controller until, at maximum speed only the coils $F^4$ are in circuit, which is the maximum speed position. While the running positions are four in number, starting with all of the coils in series, and ending with only the coils $F^4$ in series, in order to avoid sudden increases in current in the coils between the running position, the coils $F^1$ are themselves successively cut out in going from the first position to the second position, and from the second running position to the third running position the coils $F^2$ are successively cut out, and likewise for the coils $F^3$ in going from the third to the fourth running position.

In Fig. 1, 4, 5, 6, 7 and 8, are stationary contact fingers; fingers 5 and 6 being terminals of the battery B, or other source of supply; finger 4 being the terminal of coils $F^4$, and fingers 7 and 8 being the armature terminals. 9, 10 and 11 are movable contacts coöperating with these stationary fingers for forward positions, and 12, 13, 14 and 15 are movable contacts for the reverse direction. Moving with the movable contacts 9, 10, 11 is a movable contact 16 which is connected with the actuating means for the contacts 9, 10, 11 by a spring 17, or otherwise as will be hereinafter explained. The contacts 16 engage with fixed contacts 20, 21, 22, 23, 24, 25, 26, 27, 28, 29, 30, 31, 32, of which contacts 20, 24, 28 and 32 are for running positions, and the remainder being transitory positions wherein the coils of each group $F^1$, etc., are successively cut out. When the contact 16 is on contact 20, all of the coils $F^1$, $F^2$, $F^3$, $F^4$ are in series, from which the circuit returns to contact 4, and thence by strip 9 and contact 5 to the battery. In moving from contact 21 to 24, the coils of group $F^1$ will be successively cut out, so that when contact 24 is reached, the current in the remaining coils will have been gradually increased as the relatively high resistance of coils $F^1$ was removed. Between coils 24 and 28, the same condition occurs with coils $F^2$, except that coils $F^2$ are of coarser wire than the coils $F^1$ and of somewhat fewer turns, so that the resistance removed from the circuit of the motor is not as great as when the coils $F^1$ were removed. Also in going from contacts 28 to contacts 32, the same result occurs with the coils $F^3$, the resistance removed in this case being less than in the case of the coils $F^2$. With the coils $F^4$ remaining, the total ohmic resistance of the motor is at the lowest point, and the coils $F^4$ will be proportioned according to the speed and load of the motor, and with the desired field magnetization. In the operation of a switch of this design, it would be possible for the operator to move the switch rapidly to the extreme position, which would not give the motor time to accelerate sufficiently to produce a counter E. M. F. to hold back the current, thus causing an abnormal flow of current tending to waste the storage battery charge and also to injure the battery itself. To prevent this abnormal flow of current irrespective of the action of the operator or the position of the controller, the actuating means for the contact 16 is controllable by means of a magnet 33 located in the armature or main motor circuit, in which the pull will vary with the armature current. This magnet is caused to operate suitable actuating means for the contact 16 to retard or lock the same whenever there is an abnormal current flowing, and thereby preventing movement of the contact 16 tending to increase the current flowing. To accomplish this, the contact 16 is connected with the actuating shaft on which the contacts 9, 10, 11, 12, 13, 14, and 15 are mounted in such manner as to be yieldingly moved through the spring 17, and the magnet 33 prevents the spring from moving the contact whenever an abnormal current is flowing.

The specific construction of switch is shown in Figs. 2, 3 and 4, which will now be described. 40 is a shaft rotating in bearings in a frame or casing 41, and mounted on a drum 42 to rotate therewith are the contact strips 9 to 15 inclusive, on which bear the fingers 4, 5, 6 7, 8 before described. Mounted at one end of the frame is an insulating disk 45, on which the contacts 20 to 32 inclusive are mounted. The drum 42 also carries a contact disk 43 connected to the strip 11 carried by the drum 42. Mounted between the contact disk 43 and the insulating disk 45 carrying the contacts 20 to 32 inclusive, is a drum 46 which is mounted on the shaft 40 to rotate independently thereof. Connected between the interior of drum 46 and the shaft 40, is the coil spring 17, so that whenever the shaft is turned the spring will tend to rotate the drum and thereby the contacts 16 mounted thereon. As herein shown, the contacts are mounted on the drum and are pressed outwardly by a spring 47, 48 being a flexible wire for carrying the current between disk 43 and the contacts 20, etc. In order to turn the shaft 40, a pinion 49 and operating gear sector 50 mounted on a shaft 51 are provided, the shaft 51 having suitable actuating connections to be operated by the driver of the vehicle. Carried by the drum 46 is a gear wheel 53, and meshing with the gear wheel 53 is a pinion 54 loosely carried by a short shaft 55 journaled in the casing 41. It will be seen that if the rotation of the drum 46 be unobstructed, the contact 16 will move whenever the shaft 40 is moved, and if the rotation of the drum 46 is obstructed the contact 16 will not move no matter how far the shaft 40 be turned, such movement of the shaft 40 simply winding up or unwinding the spring 17. In order to lock the drum 46, means is provided for preventing the rotation of shaft 55, and controlled by the magnet 33 heretofore mentioned. The shaft 55 is mounted in a soft iron casing 56, and mounted on the shaft 55 is an armature 57 rotating therewith. Screwed into the casing 56 is a soft iron plug 58 which is held in adjusted position by a screw 67. Surrounding the plug 58 and within casing 56, is the magnetizing coil or magnet 33, before described, which is connected in the main motor circuit. It will be seen that if a current circulating in this magnet 33 is strong enough, the armature 57 will be attracted by the attraction of the polar projections and magnetically held against turning across the intervening air gap between it and plug 58. If desired the armature could be movable longitudinally of the shaft and, when attracted, interlock with the casing to prevent rotation of the shaft. Also it will be seen that the pull of the magnet can be adjusted by screwing the plug in or out. The loose pinion 54 is provided with clutch teeth 59, which are engaged by a sliding sleeve 60 splined on the shaft 55. Whenever the armature 57 is attracted to the plug 58, the spring 61 will engage the sleeve 60 with the pinion 54, and by reason of the frictional engagement between armature and the face of plug 58 prevents the rotation of gear wheel 54, and thereby of the drum 46. The coil 33 is so proportioned that whenever it carries the maximum current to be permitted under normal conditions, it will attract the armature 57, and thus prevent rotation of the drum 46 carrying the contact 16. The operator may attempt to turn the shaft 40, but this will only wind up the spring, or unwind it from its normal condition, without moving the contact 16. Whenever the current does fall so that the spring 61 releases the armature 57, the tension of the spring will automatically turn the drum to a position corresponding with the position of the shaft 40. If, however, a condition arises in which the predetermined current is not sufficient to move the motor, it is desirable to throw the automatic device out of action. This is accomplished by means of the magnet coil 63, which is controlled by a contact 64, preferably controlled by a foot push button. The effect of energizing this coil 63 is to attract the sleeve armature 60 against the tension of spring 61, thereby releasing the clutch 59 and permitting the drum to be revolved freely either by the operator or by the accumulated tension of the coil spring 17. Also, under some circumstances, this same result could be secured by causing the push button 64 to short circuit the magnet 63.

In the diagrammatic view, Fig. 1, the magnet 33 is shown actuating a lever 66 which acts on a brake-wheel 67 on the shaft 55, while clutch 59 in Fig. 1 acts the same as clutch 59 in Fig. 3, being controlled by a magnet 63. In Fig. 1 the spring 17 tends to pull the contacts 16 over the stationary contacts 20 to 32. It will be seen from Fig. 1 that reversal is secured by means of the armature contacts 13, 14, 15 in Fig. 1, without reversing the field connections. The reversed positions are the same as the forward positions 20, 21, 22, but it will be obvious that as many reversing contacts may be used as is desired. It will be seen that the first movement of the actuating shaft 40 closes contacts 4, 5, 6, 7, 8 on strips 9, 10, 11, thereby closing the circuit to the regulating contacts 20, et seq. and that further movement of the actuating shaft does not change the relations of the brushes 4, 5, 6, 7, 8. In all cases it will be understood that the controlling lever connected to the shaft 40 is usually set to a certain speed position by the operator, as he desires, and this prevents the spring 17 from opening the circuit at the contacts 4, et seq., as would be the case unless the shaft 40 was held in some way. It will also be seen that the shaft 40 can be thrown back to open circuit position at any time, even though the magnet 33 has locked the contact 16 against movement, and in case the circuit is opened at the contacts 4, as soon as the current in magnet 33 drops the spring 17 will automatically return the contact 16 to starting position or rather the first running position at the contact 20.

From the foregoing description it is thought that the nature and advantages of the invention will be fully understood. It will be seen that by this controlling mechanism described in which the relatively high resistance and strong magnetizing coils are cut out first, in succession, that the motor will be gradually accelerated. Also it will be seen that the current will not be wasted in useless resistances, besides starting the motor under a strong field, which is desirable in motors used for vehicles and traction purposes. By means of the automatic connections controlling the regulating contacts according to the counter electromotive force developed by the motor, abnormal currents are prevented and sudden rushes of current which are especially injurious to a storage battery, are avoided.

Modifications and changes may be made in the specific mechanism herein shown without departing from the scope of the invention.

Having thus described my invention, what I claim and desire to secure by Letters Patent, is:

1. The combination with a series motor having its field winding composed of a plurality of groups of coils, each group being composed of a different number of turns having a predetermined ohmic resistance, of a controlling switch and connections whereby the coils forming each group are successively cut out and the groups thus successively and progressively cut out to diminish the total ohmic resistance and magnetization and increase the current flow.

2. The combination with a series motor provided with a field winding composed of a plurality of groups of coils proportioned to have a maximum ohmic resistance and magnetizing effect when connected in series, of a controlling switch and connections whereby the coils forming each group are successively cut out and the groups are thus progressively cut out to diminish the total ohmic resistance and magnetization and increase the current flow.

3. The combination with a series motor having its field winding composed of a plurality of groups of coils, each group being composed of a different number of turns wound to have each a predetermined ohmic resistance, of a controlling switch and connections whereby the groups are successively and progressively cut out to diminish the total ohmic resistance and magnetization and increase the current flow.

4. In combination with a series motor having its field winding composed of a plurality of groups of coils connected in series, said coils comprising differing numbers of turns of predetermined ohmic resistances, of a starting switch having connections with said groups of coils whereby in starting the motor the current is maintained within a predetermined amount while said group of coils are successively and progressively cut out to simultaneously diminish the ohmic resistance and magnetization and increase the current flow.

5. In combination with a storage battery, of a series motor having its field winding composed of a plurality of groups of coils connected in series, said coils comprising differing numbers of turns of predetermined ohmic resistances, and a starting switch having connections with said groups of coils whereby in starting the motor the current is maintained within definite values while said group of coils are successively and progressively cut out.

6. The combination with a storage battery, of a series motor having its field winding composed of a plurality of groups of coils, each group being composed of a different number of turns, and a controlling switch having connections with said groups of coils whereby in operating the motor the current is maintained within definite values.

7. The combination with a storage battery, of a motor having its field winding composed of a plurality of groups of coils connected in series, said coils comprising differing numbers of turns of different resistances, and a controlling switch having a movable switch element, said controlling switch further comprising a yielding actuating connection for said switch element, and means for holding said switch element against actuation by said yielding connection when the current exceeds a predetermined amount.

In testimony whereof I affix my signature, in presence of two witnesses.

FRANK B. RAE.

Witnesses:
GEORGE S. CROSS,
V. J. GILLETT.